United States Patent [19]

Koga

[11] Patent Number: 4,991,700
[45] Date of Patent: Feb. 12, 1991

[54] SELECTOR LEVER APPARATUS FOR VEHICLE

[75] Inventor: Masazumi Koga, Oobu, Japan

[73] Assignee: Mitsubishi Jidosha Kogyo Kabushiki Kaisha, Tokyo, Japan

[21] Appl. No.: 322,683

[22] Filed: Mar. 13, 1989

[30] Foreign Application Priority Data

Mar. 15, 1988 [JP] Japan ................................. 63-33801
Jun. 30, 1988 [JP] Japan ................................. 63-87056

[51] Int. Cl.⁵ .............................................. B60K 41/28
[52] U.S. Cl. .................................. 192/4 A; 192/4 C; 74/483 R; 74/483 K
[58] Field of Search ............ 192/4 A, 4 C; 74/483 R, 74/483 K, 475, 479

[56] References Cited

U.S. PATENT DOCUMENTS

| | | | |
|---|---|---|---|
| 2,426,365 | 8/1947 | Matlock | 192/4 C X |
| 2,875,640 | 3/1959 | Huso | 74/483 K |
| 3,169,616 | 2/1965 | Hunsaker et al. | 192/4 C |
| 3,942,614 | 3/1976 | Thompson | 74/483 R X |
| 4,096,930 | 6/1978 | Viscardi | 74/483 K X |
| 4,187,935 | 2/1980 | O'Hern | 74/483 R X |
| 4,572,340 | 2/1986 | Pierce | 192/4 C |
| 4,768,610 | 9/1988 | Pagel et al. | 192/4 A X |

FOREIGN PATENT DOCUMENTS 1203756 4/1986 Canada ............... 192/4 A
60-135352 1/1958 Japan .

Primary Examiner—Laurie K. Cranmer
Attorney, Agent, or Firm—Hedman, Gibson, Costigan & Hoare

[57] ABSTRACT

A selector lever apparatus includes a selector lever shiftable to a plurality of mode setting positions including a parking position. When the selector lever is located at the parking position while a brake pedal is not depressed, the lever is locked in the parking position by a lock mechanism. The lock mechanism includes a lock pin movable between a lock position for locking the selector lever and a lock release position for allowing shifting of the lever. The lock pin is urged to the lock position by a spring. The lock pin is coupled to the brake pedal through a cable member so that the lock pin is moved to the release position upon the depression of the brake pedal.

20 Claims, 3 Drawing Sheets

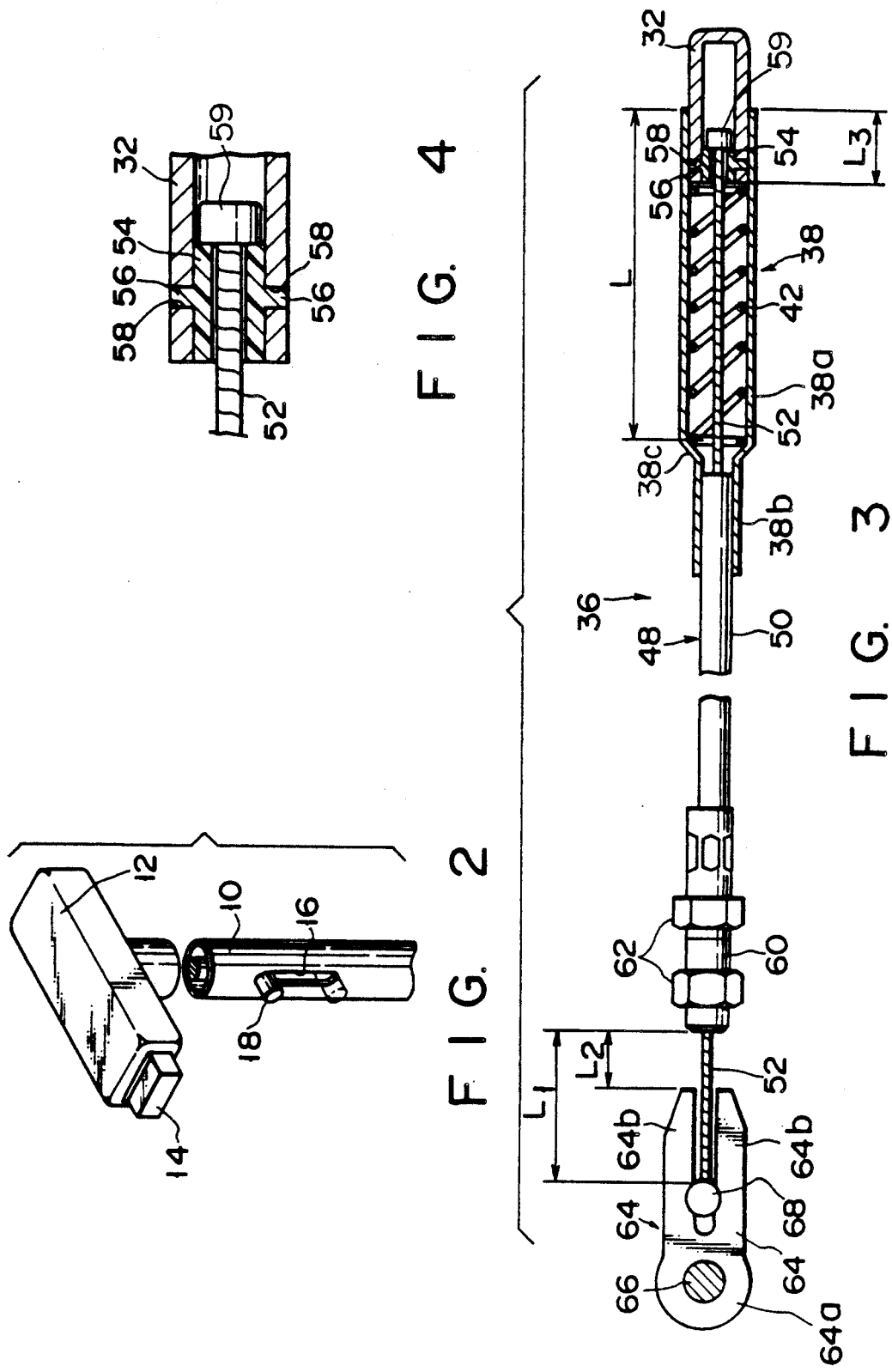

000
SELECTOR LEVER APPARATUS FOR VEHICLE

BACKGROUND OF THE INVENTION

1. Field of the Invention

The present invention relates to a selector lever apparatus for a vehicle having an automatic transmission system.

2. Description of the Related Art

Generally, the selector lever of a vehicle having an automatic transmission system (to be referred to as an AT car hereinafter) can be shifted to various positions, such as parking position (P) for mechanically fixing the output shaft of the transmission system, reverse position (R) for reversing the vehicle, neutral position (N) in which the engine output is completely disconnected from the output shaft of the transmission, and drive position (D) wherein the plurality of forward gears are shifted automatically. The action of shifting the selector lever from the parking position to another position is normally accompanied by the simultaneous pressing of a push button arranged on the selector lever.

The selector lever of the AT car is normally set at the parking position during parking so as to reliably stop the vehicle. When the vehicle is to be started, the selector lever is shifted from the parking position to the drive or reverse position after the engine is started. In this case, if the shifting operation of the selector lever is performed while the brake pedal is depressed, the vehicle is not abruptly started and hence no problem is posed. However, for example, in a state wherein the engine is rotated at high speed during warming up or immediately after the engine is raced, if the parking brake is released and the selector lever is shifted to the drive or reverse-position without depressing the brake pedal, a driving force is abruptly transmitted to the driving shaft of the vehicle. As a result, the vehicle is abruptly started against the driver's will. Abrupt starting of the vehicle may cause an accident.

Recently, demands have been arisen for a technique which can reliably prevent abrupt starting of an AT car.

SUMMARY OF THE INVENTION

The present invention has been made in consideration of the above situation, and has as its object to provide a vehicle selector lever apparatus which can reliably prevent an erroneous operation of a driver and abrupt starting of a vehicle.

In order to achieve the above object of the present invention, there is provided a vehicle selector lever apparatus, comprising a selector mechanism having a selector lever which can be shifted among a plurality of mode setting positions including a parking position, at which an output shaft of an automatic transmission is fixed, and a lock mechanism for locking the selector lever in the parking position while the brake pedal is not depressed, the lock mechanism including a lock pin movable between a lock position where it locks the selector lever the parking position and a lock release position where it permits the shifting operation of the selector lever, biasing means for biasing the lock pin to the lock position, and coupling means, having one end connected to the brake pedal and the other end connected to the lock pin, for moving the lock pin to the lock release position upon a depressing operation of the brake pedal.

According to the apparatus having the above-described arrangement, the selector lever cannot be shifted from the parking position to another position without depressing the brake pedal so as to release the lock of the selector lever. Therefore, abrupt starting of the AT car by an erroneous operation of a driver can be perfectly prevented.

BRIEF DESCRIPTION OF THE DRAWINGS

FIGS. 1 to 5 show a selector lever apparatus according to n embodiment of the present invention, in which FIG. 1 ia a side view showing the overall apparatus, FIG. 2 is a perspective view of a selector lever, FIG. 3 is a partially cutaway side view of a lock mechanism, FIG. 4 is an enlarged sectional view of a coupling member, and FIG. 5 is a side view showing part of the apparatus in an operating state different from that shown in FIG. 1.

DETAILED DESCRIPTION OF THE PREFERRED EMBODIMENTS

An embodiment of the present invention will be described in detail with reference to the accompanying drawings.

Figure 1:
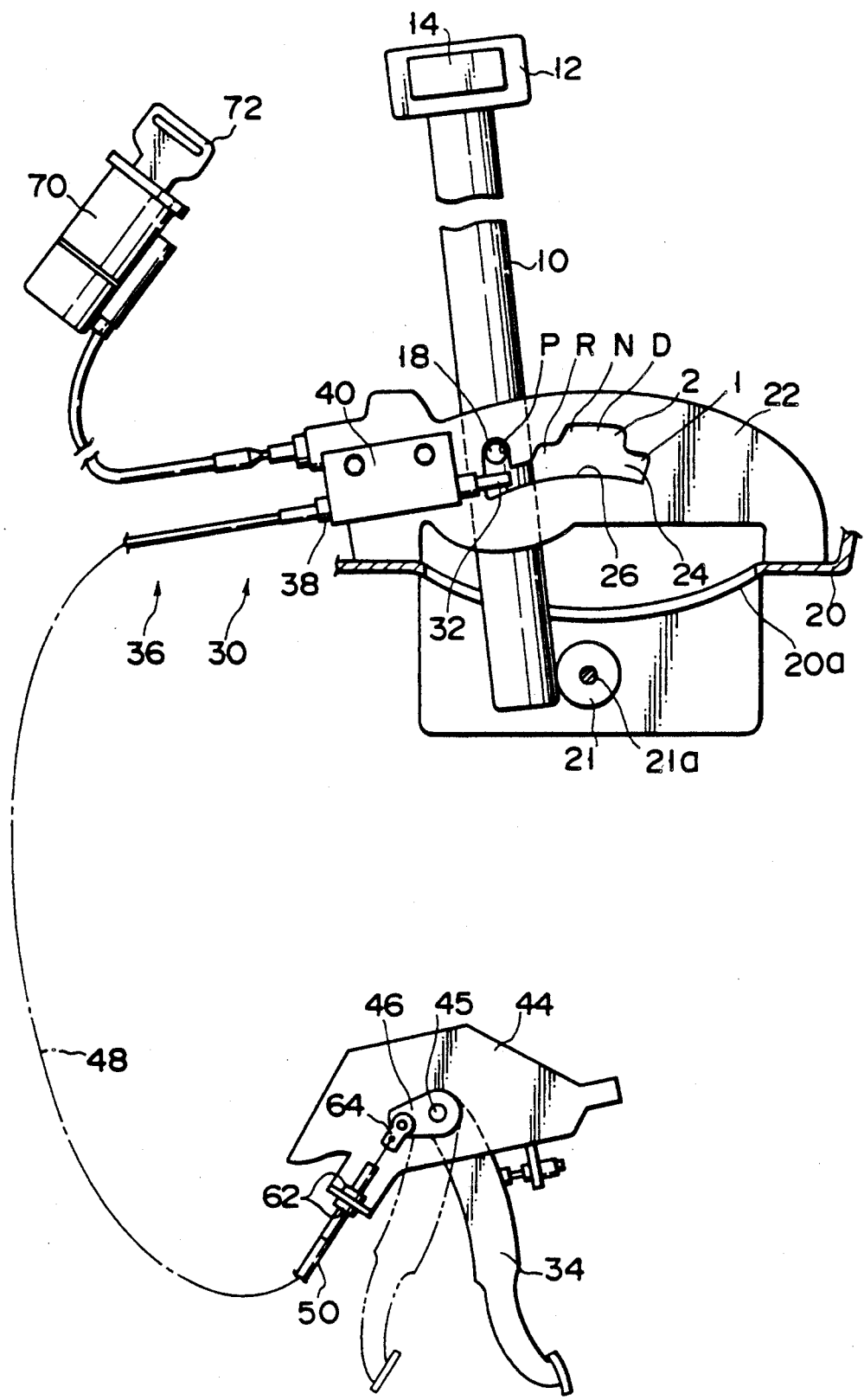
Figure 5:
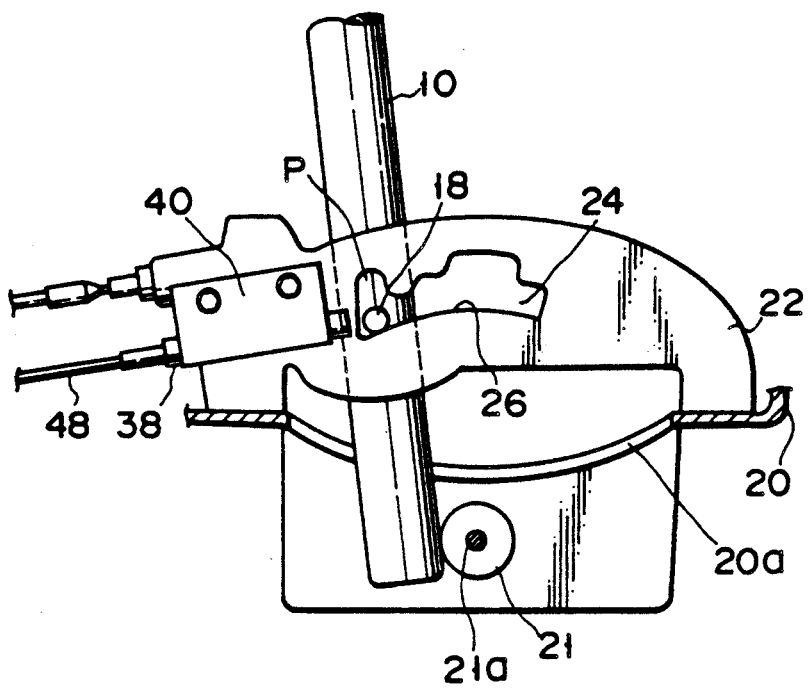

FIGS. 1 to 5 show a floor type selector lever apparatus according to an embodiment of the present invention. This selector lever apparatus comprises a selector lever 10 having a. hollow metal rod, as is shown in FIGS. 1 and 2. A knob 12 is fixed on the distal end of the selector lever 10. A push button 14 is arranged on the knob 12. The proximal end of the selector lever 10 extends through a through hole 20a of a mount plate 20 fixed on a vehicle body, and is rotatably supported by a rotation mechanism 21 below the mount plate. With this arrangement, the selector lever 10 can be selectively shifted to one of the positions, namely, a parking position (P), a reverse position (R), a neutral position (N), a drive position (D), a second gear position (2), and a low gear position (1). A slit 16 is formed in a lower portion of the selector lever 10 and extends in its axial direction. A detent pin 18 extends outward from the slit 16. As is apparent from FIG. 2, the detent pin 18 can be moved along the slit 16 between a first position indicated by a solid line and a second position indicated by a broken line. The detent pin 18 is normally held at the first position by a return spring (not shown) arranged in the selector lever 10, and is moved to the second position upon depression of the push button 14.

A detent plate 22 for holding the selector lever 10 at a desired shifting position is erected on the mount plate 20 so as to extend across a hole 20a and oppose the lever 10. An opening 24 through which the detent pin 18 passes is formed in the detent plate 22. A plurality of steps P, R, N, 2, and 1 corresponding to the respective shifting positions of the lever 10 are formed in an edge portion of the opening 24 on the side separated from the rotation mechanism 21. Especially, the step P is formed to be deeper than other steps and has a recessed shape. The selector lever 10 will be held at a desired shifting position by shifting the lever 10 to the desired position and engaging the detent pin 18 with a corresponding step. Note that when the detent pin 18 is located at the first position, it can be engaged with a desired step, and when the pin 18 is moved to the second position, it is disengaged from the step so as to allow the shifting operation of the selector lever 10. An edge portion of the opening 24 opposing the steps constitutes an arcuated guide face 26 having a pivot shaft 21a of the pivot mechanism 21 as its center. The guide face 26 guides movement of the detent pin 18 when the selector lever 10 is shifted. FIG. 1 shows a state wherein the selector lever 10 is set at the parking position The selector lever apparatus comprises a lock mechanism 30 for locking the selector lever 10 in the parking position (P). As is shown in FIGS. 1 and 3, the lock mechanism 30 includes a lock pin 32 arranged to be movable between a lock position where the pin locks the lever 10 to the parking position and a release position where it releases the lock of the lever 10, and a coupling mechanism 36 for moving the lock pin 32 between the lock position and the release position upon depression/release of the brake pedal 34.

The lock pin 32 has a cylindrical shape whose distal end is closed, and is supported by a guide sleeve 38. The guide sleeve 38 includes a large-diameter portion 38a having an inner diameter substantially equal to the outer diameter of the lock pin 32, and a small-diameter portion 38b having an inner diameter smaller than the outer diameter of the lock pin 32. The lock pin 32 is slidably inserted in the large-diameter portion 38a, and is supported thereby so as to reciprocate with respect to the distal end of the large-diameter portion 38a. The guide sleeve 38 is fixed to the detent plate 22 by a fixing plate 40. As is shown in FIGS. 1 and 3, the guide sleeve 38 is especially arranged such that when the lock pin 32 protrudes from the distal end of the large-diameter portion 38a, i.e., the lock pin 32 is moved to the lock position, the pin 32 is located at a position for preventing the detent pin 18 of the selector lever 10 at the parking position from moving to the second position from the first position. In this embodiment, when the lock pin 32 is located at the lock position, it is substantially perpendicular to the moving direction of the detent pin 18 located at the parking position, and its position overlaps the second position of the detent pin 18. In addition, the guide sleeve 38 is arranged such that when the lock pin 32 is pulled into the guide sleeve 38, i.e., the lock pin 32 is moved to the lock release position, the pin 32 is located outside the moving path of the detent pin 18.

A compression coil spring 42 as a biasing member is housed in the large-diameter portion 38a of the guide sleeve 38. Both ends of the spring 42 are respectively brought into contact with the proximal end of the lock pin 32 and a step 38c of the guide sleeve 38. The spring 42 has a free length larger than a length L of the large-diameter portion 38a. In a state wherein the spring 42 is housed in the large-diameter portion 38a as is shown in FIG. 3, it is compressed and hence accumulates a biasing force. For this reason, the lock pin 32 is always biased by the spring 42 in a direction to protrude from the guide sleeve 38, i.e., toward the lock position.

The brake pedal 34 is rotatably supported by a pivot shaft 45 of a support bracket 44 fixed on the vehicle body. An operation lever 46 rotatable together with the pivot shaft 45 upon a depressing operation of the brake pedal 34 is fixed to one end of the pivot shaft 45. The lever 46 is coupled to the lock pin 32 through a shift lock cable 48 of the coupling mechanism 36. As is shown in FIGS. 1 and 3, the cable 48 includes an outer tube 50 and an inner cable 52 which is slidably inserted in the tube 50. Both ends of the cable 52 respectively protrude from both the ends of the tube 50. One end of the tube 50 is inserted and fixed in the small-diameter portion 38b of the guide sleeve 38. One end of the cable 52 extends through the spring 42 and is coupled to the lock pin 32. In this case, as is shown in FIGS. 3 and 4, a cylindrical spacer 54 as a first coupling member is fitted in a proximal end opening of the lock pin 32. The spacer 54 has a plurality of projections 56 radially projecting from its outer surface. These projections are respectively fitted in a plurality of through holes 58 formed in the lock pin 32. The spacer 54 is formed of a synthetic resin. One end of the cable 52 is inserted in the lock pin 32 through the inner hole of the spacer 54, and is fixed to a removal stopper 59 located in the lock pin 32. The stopper 60 has an outer diameter larger than the inner diameter of the spacer 54 and smaller than the inner diameter of the lock pin 32, and prevents removal of the cable 52 from the lock pin 32. In addition, each projection 56 of the spacer 54 is formed so as to have a strength which allows the projection 56 to be torn off from the spacer 54 when a force exceeding a predetermined value acts on the spacer 54 in its axial direction. When these projections 56 are torn off from the spacer 54, the spacer 54 is removed from the lock pin 32, and coupling of the cable 52 and the lock pin 32 is released. As a result, the lock pin 32 is forced out from the guide sleeve 38 by the spring 42.

As is shown in FIGS. 1 and 3, a cylindrical mount member 60 is fixed to the other end of the outer tube 50. Thread portions are formed on the outer surface of the member 60, and a pair of nuts 62 are threadably engaged with the thread portions, respectively. The other end of the tube 50 is fixed to the bracket 44 by the nuts 62. The other end of the cable 52 protruding from the mount member 60 is coupled to a cable end 64 as a second coupling member. The cable end 64 has a proximal end portion 64a which is rotatably attached to a support pin 66 protruding from the operation lever 46 of the brake pedal 34. In addition, the cable end 64 has a pair of leg portions 64b extending from the proximal end portion 64a. A ball 68 is fixed to the other end of the cable 52 and fitted between the leg portions 64b. The cable end 64 is made of a synthetic resin. When a force exceeding a predetermined value acts on a portion between the cable end 64 and the cable 52 in a direction to separate them from each other, the leg portions 64b are elastically deformed in a direction to be separated from each other, thus causing the ball 68 to be removed from the gap between the leg portions 64b.

The lock pin 32 is coupled to the brake pedal 34 through the coupling mechanism 36 in this manner, so that while the brake pedal 34 is not depressed as indicated by a solid line in FIG. 1, the lock pin 32 is held at the lock position at which the pin 32 protrudes from the guide sleeve 38 by the spring 42 arranged in the guide sleeve 38. When the brake pedal 34 is depressed as indicated by an alternate long and dashed line in FIG. 1, the cable 52 is pulled toward the brake pedal, and hence the lock pin 34 is moved into the guide sleeve 38, i.e., to the lock release position, against the biasing force of the spring 42.

The size of each component of the lock mechanism 30 is set to satisfy the following relationship in a state wherein the lock mechanism 30 is properly mounted in the vehicle body and the brake pedal 34 is not depressed. Assume that a distance between the distal end of each leg portion 64b of the cable end 64 and the end of the mount member 60 is set to be $L_2$, a distance between the ball 68 and the end of the mount member 60 is set to be $L_1$, and an overlapping length of the lock pin 32 with respect to the guide sleeve 38 is set to be $L_3$, as is shown in FIG. 3. In this case, the size of each component is set to satisfy $L_1 > L_3 > L_2$.

Note that reference numeral 70 in FIG. 1 denotes a key cylinder comprising a key interlock mechanism for allowing removal of an ignition key 72 from the key cylinder only when the selector lever 10 is set at the parking position.

The operation of the selector lever apparatus having the above-described arrangement will be described.

As is shown in FIG. 1, when the selector lever 10 is set at the parking position during, e.g., parking, without depressing the push button 14 and the brake pedal 34, the detent pin 18 is located at the first position and engaged with the step P of the detent plate 22. Since the brake pedal 34 is not depressed, the lock pin 32 of the lever lock mechanism 30 is held at the lock position. For this reason, the detent pin 18 is inhibited by the lock pin 32 from moving from the first position to the second position, and hence is held at the first position shown in FIG. 1. Therefore, even if the push button 14 is depressed, the detent pin 18 cannot be moved to the second position, so that the selector lever 10 is held in a state wherein the shifting operation thereof cannot be performed.

A shifting operation of the selector lever 10 can be performed only when the brake pedal 34 is depressed. More specifically, when the brake pedal 34 is depressed, the operation lever 46 is rotated about the pivot shaft 45 clockwise. Upon rotation of the lever 46, the cable 52 of the lock cable 48 pulls the lock pin 32 into the guide sleeve 38. With this operation, the lock pin 32 is moved to the lock release position where the pin 32 is withdrawn from the moving path of the detent pin 18. As a result, the locked state of the detent pin 18 is released, and the pin 18 can be moved from the first position to the second position. If the push button 14 of the selector lever 10 is depressed in this state, the detent pin 18 is moved from the first position to the second position, and is disengaged from the step P. Thus, the shifting operation of the lever 10 is enabled. If the depressing force acting on the brake pedal is released after the lever 10 is shifted from the parking position to, e.g., the drive position (D), the lock pin 32 is returned to the lock position by the spring 42 and held there.

When the selector lever 10 is to be shifted from e.g., the drive position (D) to the parking position (P) again, the push button 14 is depressed first to move the detent pin 18 to the second position and disengage it from the step D. In this state, the lever 10 is rotated to the parking position (P). At this time, the lock pin 32 is held at the lock position and protrudes onto the moving path of the detent pin 18. For this reason, while the lever 10 is rotated, the detent pin 18 is brought into contact with the distal end of the lock pin 32 and pushes it toward the lock release position against the biasing force of the spring 42. Therefore, the lever 10 can be rotated to the parking position P. When the biasing force acting on the button 14 is removed, the detent pin 18 is returned from the second position to the first position due to the function of the return spring, and is engaged with the step P of the detent plate 22. With this operation, the selector lever 10 is held at the parking position (P). At the same time, when the detent pin 18 is moved to the first position, the biasing force for biasing the lock pin 32 toward the lock release position is released. Thus, the lock pin 32 is moved to the lock position again by the spring 42, and locks the detent pin 18 to the first position. As a result, the state shown in FIG. 1 is set again, and hence the selector lever 10 is locked to the parking position (P). Since the selector lever apparatus having the above-described arrangement comprises the lever lock mechanism 30 to be operated upon a depressing operation of the brake pedal, the selector lever cannot be shifted from the parking position to another position without depressing the brake pedal. With this arrangement, an erroneous operation of the driver can be prevented, and abrupt starting of the vehicle can be reliably prevented even when the selector lever is shifted during warming up or the engine is raced.

If the lock mechanism 30 fails for some reason, e.g., when the lock pin 32 is fixed to the guide sleeve 38 and cannot be moved toward the lock release position, the brake pedal 34 cannot be pivoted even by depressing it with normal depressing force. In such a case, the brake pedal 34 is depressed with larger force. As a result, tension larger than the one acting during a normal braking operation is applied to the inner cable 52 of the shift lock cable 48. This excessive tension acts on the proximal end portion of each projection 56 of the spacer 54 as shear force. When this shear force exceeds the predetermined value, the projections 56 are torn from the spacer 54 at their proximal end portions. As a result, the spacer 54 is removed from the lock pin 32 by the cable 52. At the same time, the lock pin 32 is pushed out from the distal end of the guide sleeve 38 by the spring 42, and drops down therefrom. Thus, the cable 52 can be freely moved upon operation of the brake pedal 34. This prevents the lock mechanism 30 from interfering with a braking operation. In addition, since the lock pin 32 is pulled off from the guide sleeve 38, the locked state of the detent pin 18 is released. This arrangement can prevent a state wherein the lever 10 cannot be shifted from the parking position (P) to another position.

Note that the excessive tension acting on the cable 52 also acts on the cable end 64 through the ball 68. For this reason, the leg portions 64b of the cable end 64 are deformed in a direction to remove the ball 68 from the cable end 64. In this embodiment, however, the cable end 64 is designed to be deformed when it receives larger force than the force for tearing the projections 56 of the spacer 54. For this reason, when the brake pedal 34 is depressed with large force while the lock pin 32 is fixed, the projections 56 of the spacer 54 are torn off first, and the cable end in 64 is not deformed.

When the cable 52 is disconnected for some reason, the lock pin 32 is pushed out from the distal end of the guide sleeve 38 together with part of the cable 52 due to the biasing force of the spring 42 in the same manner as described above. In such a case, therefore, the braking operation and the shifting operation of the selector lever 10 can be ensured.

Moreover, when an intermediate portion of the lock cable 48 is biased to catch the inner cable 52, and the inner cable 52 cannot be moved toward the brake pedal 34, the brake pedal 34 cannot be depressed with a normal depressing force. In such a case, the brake pedal 34 is depressed with large force. With this operation, a tension which is larger than the one acting during a normal braking operation acts on that portion of the inner cable 52 between the above-mentioned caught portion and the cable end 64. This excessive tension acts on the fitting portion between the cable end 64 and the ball 68 in a direction for pulling the ball 68 from the cable end 64. When this tension exceeds the predetermined value, the leg portions 64b of the cable end 64 are deformed in a direction to be separated from each other, and the ball 68 is pulled from the cable end. Thus, the brake pedal 34 can be freely moved. As a result, the braking operation can be performed without interference of the lock mechanism 30. At the same time, the cable 52 is moved together with the lock pin 32 by the biasing force of the spring 42 in a direction to be pulled from the guide sleeve 38, so that the lock pin 32 and the distal end of the cable 52 fall out the guide sleeve 38. As a result, the locked state of the selector lever 10 is released. This prevents a state wherein the lever cannot be shifted from the parking position (P) to another position.

As is shown in FIG. 3, the overlapping length L3 of the lock pin 32 with respect to the guide sleeve 38 is set to be smaller than the protrusion length $L_1$ of the cable 52 from the mount member 60. Therefore, when the ball 68 is disengaged from the cable end 64, the lock pin 32 reliably falls out the guide sleeve 38.

As is described above, even if malfunction occurs in the lock mechanism 30, coupling of the brake pedal 34 and the lock pin 32 can be released. Therefore, a state wherein the braking operation and shifting inhibition of the selector lever 10 can be reliably prevented.

In addition, the size of each component of the lock mechanism 30 is set to satisfy $L_1 > L_3 > L_2$, so that the lock mechanism 30 can be easily mounted in the vehicle. More specifically, in a state before the lock mechanism 30 is coupled to the brake pedal 34 and the detent plate 22, the lock pin 32 is biased by the spring 42 in a direction to protrude from the guide sleeve 38. Similarly, the inner cable 52 and the cable end 64 are biased by the spring 42 in the same direction, and are moved until the distal end of the cable end 64 is brought into contact with the mount member 60. In a case wherein $L_3 < L_2$ is set for example, if the cable end 64 is moved by the length $L_2$, the lock pin 32 falls off the guide sleeve 38. For this reason, during an operation of mounting the lock mechanism 30 in the vehicle is performed, the lock pin 32 must be pushed by some means into the guide sleeve against the biasing force of the spring 42. According to the embodiment, however, since $L_3 > L_2$ is set, even if the cable end 64 is moved by the length L2, the lock pin 32 is still held in the guide sleeve 38, and is not removed therefrom. Therefore, during mounting of the lock mechanism 30, the lock pin 32 need not be held by some means in the guide sleeve 38, and workability can be greatly improved.

The present invention is not limited to the above embodiment, but can be variously changed and modified within the spirit and scope of the invention.

In the above embodiment, when the brake pedal 34 is depressed with large force while the lock pin 32 is fixed, the spacer 54 is disconnected from the lock pin 32. However, coupling of the cable end 64 and the inner cable 52 may be released simultaneously with the disconnection of the spacer 54. In addition, coupling of the cable end 64 and the inner cable 52 may be released prior to the disconnection of the spacer 54.

Figure 6:
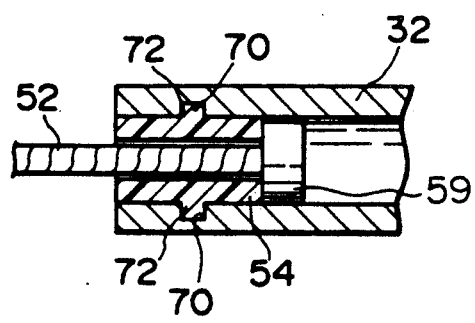
FIG. 6 is a sectional view showing a modification of the coupling member.

The lock pin 32 and the spacer 54 may be arranged as is shown in FIG. 6.

According to this modification, an annular engaging groove 70 is formed on the inner surface of the lock pin 32. The spacer 54 has an annular projection 72 fitted in the engaging groove 70 in place of the projections 56. The projection 72 is designed to be torn from the spacer 54 when tension exceeding a predetermined value acts on the spacer 54 through the inner cable 52 of the lock cable 48.

The same advantages as described in the above embodiment can be obtained by using the spacer 54 arranged in this manner.

Further, in the above embodiment, both ends of the inner cable 52 are coupled to the lock pin 32 and the brake pedal 34, respectively, so that both coupling portions can be released when large tension is applied to the cable 52. However, in this invention, the same advantages as in the above embodiment can be obtained even in the case wherein only one of the coupling portions is formed to be releasable.

What is claimed is:

1. A selector lever apparatus for use in a vehicle having an automatic transmission, comprising;
   a selector mechanism having a selector lever shiftable to a plurality of mode setting positions including a parking position wherein an output shaft of the automatic transmission is fixed; and
   a lock mechanism for locking the selector lever when it is in the parking position and the brake pedal has not been depressed, said lock mechanism including a lock pin movable between a lock position where the lock pin locks the selector lever in the parking position and a lock release position where the lock pin allows shifting of the selector lever, biasing means for biasing the lock pin to the lock position, and coupling means including a connecting member having one end connected to the brake pedal and the other end connected to the lock pin, for moving the lock pin to the lock release position upon a depressing of the brake pedal, said coupling means including means for releasing the coupling between the lock pin and the brake pedal when a tension exceeding a predetermined value acts on the connecting member.

2. An apparatus according to claim 1, wherein said selector mechanism includes a detent plate which is arranged near the selector lever and has a plurality of engaging portions corresponding to the mode setting positions of the selector lever, said selector lever includes a detent pin movable between a first position where the detent pin engages with one of the engaging portions to hold the selector lever at the corresponding mode setting position and a second position where the detent pin disengages from the engaging portion to allow shifting of the selector lever, and said lock pin is arranged to restrict movement of the detent pin from the first position to the second position, at the lock position, and to allow movement of the detent pin from the first position to the second position, at the lock release position.

3. An apparatus according to claim 1, wherein said lock mechanism includes a substantially cylindrical support member supported by a vehicle body and having a pair of open ends, said lock pin has a substantially cylindrical shape having a closed distal end and an open proximal end and is arranged in an inner hole of the support member so as to be slidable between the lock position where the distal end of the lock pin protrudes from one end of the support member and the lock release position shifted from the lock position into the support member, and said biasing means includes a spring, arranged in the support member, for biasing the lock pin in a direction to cause the lock pin to protrude from said one end of the support member.

4. An apparatus according to claim 1, wherein said release means includes a coupling member, arranged between the connecting member and the lock pin, for releasing coupling between the connecting member and the lock pin when tension exceeding the predetermined value acts on the connecting member.

5. An apparatus according to claim 4, wherein said lock pin has a substantive cylindrical shape and an open proximal end, said locking pin including an engaging portion formed on an inner circumferential surface thereof, and said coupling member includes a cylindrical main body coupled to the connecting member and fitted in the proximal portion of the lock pin, and a projecting portion protruding from the main body and engaged with the engaging portion, said projecting portion adapted to break off from the main body when a tension exceeding the predetermined value acts on the main body via the connecting member so as to allow the main body to separate from the lock pin.

6. An apparatus according to claim 5, wherein said engaging portion includes a plurality of through holes formed in the lock pin and extending in the radial direction thereof, and said projecting portion includes a plurality of projections protruding from the outer circumferential surface of the main body and respectively fitted in the through holes.

7. An apparatus according to claim 5, wherein said engaging portion includes an annular groove formed on the inner circumferential surface of lock pin, and said projecting portion includes an annular projection protruding from the outer circumferential surface of the main body and fitted in the annular groove.

8. An apparatus according to claim 5, wherein said coupling member is formed of a synthetic resin.

9. An apparatus according to claim 5, wherein said connecting member includes an outer tube having one end connected to the support member, and an inner cable slidably inserted in the outer tube, and said inner cable includes one end portion inserted in the lock pin through the support member and the inner hole of the coupling member main body, and a removal stopper fixed to said one end of the inner cable, for preventing removal of the inner cable from the lock pin in cooperation with the main body.

10. An apparatus according to claim 1, wherein said release means includes a coupling member, arranged between the connecting member and the brake pedal, for releasing coupling therebetween when tension exceeding a predetermined value acts on the connecting member.

11. An apparatus according to claim 10, wherein said coupling member includes a proximal end portion connected to the brake pedal, and a pair of leg portions extending from the proximal end portion and clamping an end portion of the connecting member, the leg portions being elastically deformable in a direction to be separated from each other so as to allow the end portion of the connecting member to be disconnected from the leg portions when tension exceeding the predetermined value acts on the connecting member.

12. An apparatus according to claim 11, wherein said connecting member includes an outer tube having one end fixed to the support member, and an inner cable slidably inserted to the support member, and an inner cable slidably end protruding from one end of the tube and coupled to the lock pin, and a second end extending from the other end of the tube and coupled to the second coupling member, and a length $L_1$ of that portion of the inner cable which protrudes from the other end of the tube, a distance $L_2$ between the other end of the tube and the leg portions, and an overlapping length $L_3$ of the lock pin with respect to the support member are set so as to satisfy $L_1 > L_3 > L_2$ in a state wherein the lock pin is located at the lock position.

13. An apparatus according to claim 1, wherein said release means includes a first coupling member, arranged between the connecting member and the lock pin, for releasing the coupling between the connecting member and the lock pin when a tension exceeding the predetermined value acts on the connecting member, and a second coupling member, arranged between the connecting member and the brake pedal, for releasing the coupling between the connecting member and the brake pedal when the tension exceeding the predetermined value acts on the connecting member.

14. An apparatus according to claim 13, wherein said lock pin is of a substantially cylindrical shape and has an open proximal end, said lock pin including an engaging portion formed on an inner circumferential surface thereof, and said first coupling member includes a cylindrical main body coupled to the connecting member and fitted in the proximal portion of the lock pin, and a projecting portion protruding from the main body and engaged with the engaging portion, said projecting portion adapted to break off from the main body when a tension exceeding the predetermined value acts on the main body via the connecting member, so as to allow the main body to separate from the lock 15. An apparatus according to claim 14, wherein said engaging portion includes a plurality of through holes formed in the lock pin and extending in the radial direction thereof, and said projecting portion includes a plurality of projections protruding from the outer circumferential surface of the main body and respectively fitted in the through holes.

16. An apparatus according to claim 14, wherein said engaging portion includes an annular groove formed on the inner circumferential surface of the lock pin, and said projecting portion includes an annular projection protruding from the outer circumferential surface of the main body and fitted in the annular groove.

17. An apparatus according to claim 14, wherein said first coupling member is formed of a synthetic resin.

18. An apparatus according to claim 14, wherein said connecting member includes an outer tube having one end connected to the support member and an inner cable slidably inserted in the outer tube, and said inner cable includes one end portion inserted in the lock pin through the support member and the inner hole of the first coupling member main body, and a removal stopper fixed to said one end of the inner cable, for preventing removal of the inner cable from the lock pin in cooperation with the main body.

19. An apparatus according to claim 18, wherein said second coupling member includes a proximal end portion connected to the brake pedal, and a pair of leg portions extending from the proximal end portion and clamping an end portion of the connecting member, the leg portions being elastically deformable in a direction such that they are separated from each other so as to allow the nd portion of the connecting member to be disconnected from the leg portions when tension exceeding the predetermined value acts on the connecting member.

20. An apparatus according to claim 19, wherein said inner cable includes a first end, protruding from one end of the tube and coupled to the lock pin, and a second end, extending from the other end of the tube and coupled to the second coupling member, and a length $L_1$ of that portion of the inner cable which protrudes from the other end of the tube, a distance $L_2$ between the other end of the tube and the leg portions, and an overlapping length $L_3$ of the lock pin with respect to the support member are set so as to satisfy $L_1 > L_3 > L_2$ in a state wherein the lock pin is located at the lock position.

* * * * *

UNITED STATES PATENT AND TRADEMARK OFFICE
CERTIFICATE OF CORRECTION

PATENT NO. : 4,991,700

DATED : 2/12/91

INVENTOR(S) : Masazumi Koga

It is certified that error appears in the above-identified patent and that said Letters Patent is hereby corrected as shown below:

Title page, foreign priority data "63-33801" should read -- 63-33801 (U) -- and "63-87056" should read -- 63-87056 (U) --.

Column 10, line 24, after "lock" insert -- pin. --.

Signed and Sealed this

Thirteenth Day of October, 1992

*Attest:*

DOUGLAS B. COMER

*Attesting Officer*      *Acting Commissioner of Patents and Trademarks*